United States Patent [19]

Montague

[11] Patent Number: 4,602,308
[45] Date of Patent: Jul. 22, 1986

[54] CIRCUIT FOR SUPPRESSING TRANSIENTS OCCURRING IN EITHER COMMON OR TRANSVERSE MODES

[75] Inventor: Herbert R. Montague, Binghamton, N.Y.

[73] Assignee: Control Concepts Corporation, Binghamton, N.Y.

[21] Appl. No.: 528,072

[22] Filed: Aug. 31, 1983

[51] Int. Cl.[4] ............................................. H02H 1/04
[52] U.S. Cl. ..................................... 361/91; 361/110; 361/111; 361/113
[58] Field of Search .................. 361/54, 56, 35, 91, 361/110, 111, 113, 118; 307/326, 327, 328, 540, 543, 559, 542; 323/220, 229, 230, 231; 333/177, 180; 328/169, 170, 171

[56] References Cited

U.S. PATENT DOCUMENTS

| 3,047,746 | 7/1962 | Beckery | 361/111 X |
| 3,173,029 | 3/1965 | Nadolsky | 307/327 |
| 4,095,163 | 6/1978 | Montague | 361/56 X |
| 4,156,838 | 5/1979 | Montague | 361/110 X |

FOREIGN PATENT DOCUMENTS

| 53249 | 4/1977 | Japan | 361/56 |
| 397571 | 8/1933 | United Kingdom | 33/177 |

Primary Examiner—Harry E. Moose, Jr.
Attorney, Agent, or Firm—Lowe, King, Price & Becker

[57] ABSTRACT

A circuit for attenuating interfering voltage excursions occurring in either the common mode or transverse mode. An isolation transformer having primary and secondary windings separated by a conductive grounded shield has connected across one or both of its windings a shunt path comprising a capacitor in series with a breakdown device of predetermined bi-directional threshold conduction level with a dead band.

5 Claims, 3 Drawing Figures

CIRCUIT FOR SUPPRESSING TRANSIENTS OCCURRING IN EITHER COMMON OR TRANSVERSE MODES

TECHNICAL FIELD

This invention relates generally to the suppression of transient voltages and, more particularly, to the attenuation of power line transient voltages of both the common and transverse modes.

BACKGROUND OF THE INVENTION

Heretofore, in many power supplies, isolation transformers have been frequently used to protect electrical and electronic components or equipment from voltage transients or interference occurring on a power line. Such disturbances can be caused by switching large currents, lightning or other discharges on the supply lines. These disturbances are present both as common mode and transverse mode interferences.

To overcome common mode interference, in which the pair of power conductors both vary together in voltage and phase with respect to ground, the isolation transformers are shielded to prevent capacitive coupling between the primary and secondary windings. The shield is placed between the two windings and grounded, along with the core, so that common mode interference currents will flow to ground.

Such shielding, however, fails to effectively protect against interference produced by sudden transients occurring on one line with respect to the other in a transverse mode. This interference, usually of high frequency, is attenuated to only a limited degree by the transformer and requires further countermeasures as disclosed in U.S. Pat. Nos. 4,156,838 and 4,095,163 issued to H. R. Montague. The protection against transverse mode interference offered by these circuits includes an inductor in series with the power source and load and an auxiliary path in shunt with the load having parallel, bi-directional threshold devices in series with a capacitor. At normal powerline frequencies, the inductor and capacitor do not significantly load the powerline because the lowpass filter formed by these components has a cut-off frequency much higher than that of the power source. High frequency transients, on the other hand, see a low impedance path and the threshold devices provide a narrow dead band before allowing conduction of the transients.

The circuits shown in the two aforementioned patents have certain disadvantages. The series inductor can saturate thus limiting its effectiveness at high currents. Furthermore, there is energy inefficiency in the core losses of the inductor and there is the added cost of the manufacture and installation of the inductor. The inductor also has a limited high frequency response.

OBJECTS AND SUMMARY OF THE INVENTION

It is accordingly a primary object of this invention to provide apparatus for suppressing power line interference in both the common and transverse modes with greater efficiency.

A further object of this invention is to provide transient suppression apparatus in which the leakage reactance of the windings of an isolation transformer serves as the inductor of a low pass filter to thereby avoid saturation and core loss experienced in a conventional series inductor.

Yet another object of this invention is to provide suppression apparatus for transients in the common and transverse mode in which a series inductor of a low pass filter is eliminated and effectively replaced by one winding of an isolation transformer.

The foregoing objects are attained in accordance with this invention by providing an isolation transformer in which the windings are shielded with conductive elements connected to the core and ground, a load is connected across one of the windings, and a shunt branch is in parallel with one of the windings that includes a capacitor in series with bi-directional voltage breakdown means.

With this circuit there is little likelihood of saturating the shunted winding because the winding serves as an air inductor having leakage reactance. The air inductor also has wider frequency response.

The foregoing and other objects, features and advantages will be apparent from the following, more detailed description of the preferred embodiments of the invention given by way of example with reference to the accompanying drawing.

DESCRIPTION OF THE PREFERRED EMBODIMENTS

Figure 1:
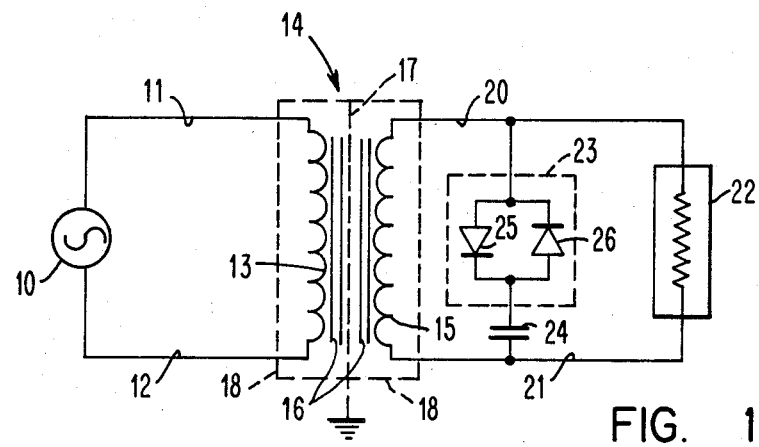
FIG. 1 is a schematic diagram of a circuit constructed according to the principles of the invention for suppressing powerline disturbances occurring in both the common and transverse modes.

Referring to FIG. 1, an alternating or cyclic electrical source 10, such as a generator or other power source, is connected via lines 11 and 12 to primary winding 13 of an isolation transformer, indicated generally as 14. Primary winding 13 and secondary winding 15 are wound as separate coils and placed on a common laminated core 16 and separated by a conductive shield 17 that is electrically connected with the end bells 18, in turn connected to ground. Shield 17 and end bells 18 are indicated schematically as dashed lines.

Secondary winding 15 is connected via lines 20, 21 across a load 22. A shunt path across lines 20 and 21 and parallel to both the secondary winding 15 and load 22 includes breakdown device 23 and capacitor 24 in series. The breakdown device comprises a pair of parallel, oppositely poled semiconductor 25, 26 having a fixed conduction threshold. These devices can be replaced with Zener diodes placed back to back, or multiple similarly poled strings of diodes can be used to establish a desired threshold voltage.

In operation, the grounded shielding 17 and end bells 18 will shunt to ground any common mode disturbances that are normally transmitted through inter-winding capacitance or other capacitances between the secondary circuit and ground. Other disturbances such as sudden transients of high frequency content that occur in one line relative to the other are attenuated by the low pass filter formed by the transformer leakage reactance and capacitor 24. These disturbances are attenuated rapidly by the threshold conduction device 23 that creates a dead band thereby reducing the tendeny to oscillate. The leakage reactance of transformer 14, being in essence an air inductor, has very little tendency to saturate. In addition, because of this reactance, the filter arrangement beneficially has lower core losses and a wider frequency response. Windings 13 and 15 thus serve both as transformer windings and filter inductor. In normal operation without disturbances, the filter formed by the leakage reactance and capacitor 24 present a high impedance to the power line supply frequency.

Figure 2:
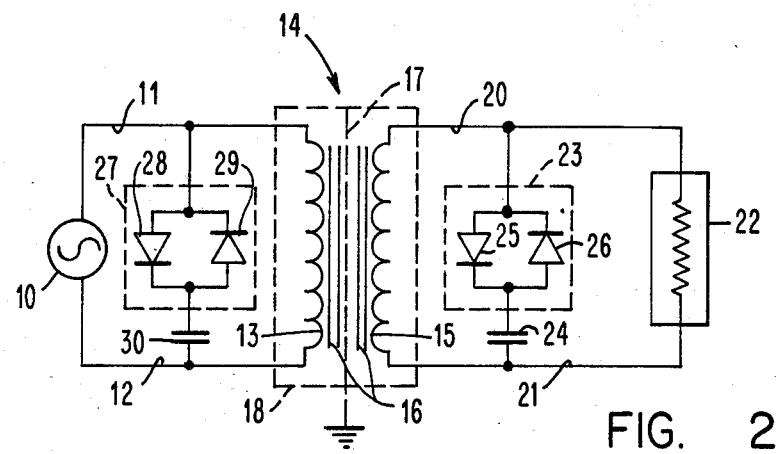
FIG. 2 is a modification of the circuit shown in FIG. 1 for suppressing powerline disturbances occurring in either the primary or secondary portions of the supply.

A modification of the combined isolation transformer-low pass filter is shown in FIG. 2 where a shunt path of breakdown device 27, comprised of diodes 28 and 29, and capacitor 30 is in parallel with primary winding 13. With this arrangement, high frequency disturbances are attenuated when originating on either side of transformer 14. The leakage reactance serves as an inductor for both capacitors 30 and 24 in forming the low pass filters for attenuating transients in the transverse mode.

Figure 3:
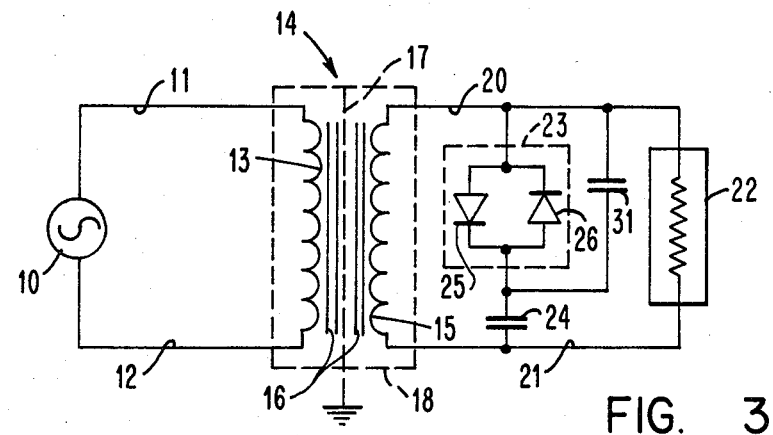
FIG. 3 is another modification of the circuit shown in FIG. 1 which has an added capacitor for further attenuating any transients resulting from threshold switches.

The embodiment in FIG. 3 is another modification of that shown in FIG. 1. In this circuit, a small capacitor 31 is added in parallel with threshold device 23. The purpose of this capacitor is to further reduce the relatively minor transient produced by threshold device 23 when initially turning on. Capacitor 31 is approximately one tenth the value of capacitor 24.

It will be seen from the foregoing description that a power supply arrangement is provided in which transient voltage excursions occurring in both the common and transverse modes can be readily and reliably attenuated. This attenuation is furthermore obtained at modest cost by utilizing the functions of the isolation transformer windings.

While there has been shown and described particular embodiments of the invention, it will be apparent that various modifications and improvements can be made therein without departing from the spirit and scope of the invention as defined in the appended claims.

What is claimed is:

1. A circuit for suppressing coupling of common mode and transverse mode transients on an a.c. power line to a load comprising a transformer having: (a) a primary winding adapted to be connected to the power line, (b) a secondary winding having a pair of output terminals adapted to be connected to the load, (c) inductive leakage reactance, (d) an electrostatic shield separating the primary and secondary windings, and (e) a structure electrically connected to the shield and arranged so that the common mode transients are shunted to the structure from the primary winding and the shield via electrostatic coupling between the primary winding and the shield; a low pass filter transverse mode transient suppression network including as its only inductive reactance the transformer leakage reactance to substantially prevent core losses and core saturation and insert substantial reactive impedances in series with the load, and a shunt circuit across one of said windings, the shunt circuit including in series a capacitor and bi-directional breakdown means having a predetermined dead band threshold, the component values of the suppression network being such that the power line frequency is passed thereby without substantial attenuation and high frequency components of the transverse mode are substantially attenuated thereby after achieving the dead band threshold.

2. The circuit of claim 1 further including another shunt path comprising a second capacitor in series with a second breakdown means having a predetermined threshold conduction level with a dead band, said another shunt path being connected across the other of said windings.

3. The circuit of claim 1 further including another capacitor connected in series with said capacitor and in parallel with said breakdown means.

4. The circuit of claim 3 wherein said other capacitor has a capacity approximately one-tenth that of said capacitor.

5. The circuit of claim 1 wherein the shunt circuit is connected across the secondary windings.

* * * * *